United States Patent [19]
Rudd

[11] 3,872,275
[45] Mar. 18, 1975

[54] FORGE WELDING WITH INDUCTION COIL HEATING

[75] Inventor: Wallace C. Rudd, Larchmont, N.Y.

[73] Assignee: Thermatool Corp., Stamford, Conn.

[22] Filed: Dec. 12, 1973

[21] Appl. No.: 424,004

[52] U.S. Cl............ 219/10.43, 219/9.5, 219/10.73, 219/85 A, 219/154
[51] Int. Cl. ............................................. H05b 5/08
[58] Field of Search .......... 219/7.5, 8.5, 9.5, 10.41, 219/10.43, 10.53, 10.57, 10.73, 150, 152, 154, 67, 85, 149, 101, 93, 85 A

[56] References Cited
UNITED STATES PATENTS

| | | | |
|---|---|---|---|
| 2,649,527 | 8/1953 | Chapman et al.............. | 219/7.5 |
| 2,730,599 | 1/1956 | Ronay......................... | 219/7.5 |
| 2,785,263 | 3/1957 | VanIpercin................... | 219/9.5 X |
| 2,912,549 | 11/1959 | Dunn........................... | 219/10.41 X |
| 3,022,407 | 2/1962 | Robinson et al.............. | 219/9.5 |
| 3,031,554 | 4/1962 | Jackson....................... | 219/8.5 X |
| 3,247,591 | 4/1966 | Pansevi........................ | 219/9.5 X |
| 3,254,404 | 6/1966 | Becker........................ | 219/7.5 UX |
| 3,374,529 | 3/1968 | Osborn et al. .............. | 219/7.5 UX |
| 3,591,757 | 7/1971 | Rudd........................... | 219/67 |
| 3,737,613 | 6/1973 | Gillock....................... | 219/10.79 |

FOREIGN PATENTS OR APPLICATIONS
968,733  3/1958  Germany ....................... 219/10.43

OTHER PUBLICATIONS
E. Bennett, "The Proximity Effect, etc.," Trans. AIEE, V51, 1932, Reprint.

Primary Examiner—Bruce A. Reynolds
Attorney, Agent, or Firm—Brooks Haidt & Haffner

[57] ABSTRACT

Two adjacent re-entrant surfaces of metal parts to be welded together, at least one of the parts having metal extending in a direction away from an edge of its surface, and the metal immediately adjacent to such surfaces are heated to forge welding temperature by an induction coil supplied with an electric current having a magnitude and frequency for a time which will cause such heating without significant melting of the metal or over-heating and consequent damage to the remainder of the parts and after the forge welding temperature is reached, pressure sufficient to forge weld the parts together at such surfaces is applied to the parts.

14 Claims, 40 Drawing Figures

FORGE WELDING WITH INDUCTION COIL HEATING

This invention relates to the forge welding of metal parts using electrical induction heating for the heating of the parts to forge welding temperature.

Forge welding is to be distinguished from other types of welding, such as fusion or cast welding, in which the metals of the parts to be joined are heated to melting temperature, the molten metal merging to form the weld, and welding in which filler metals are used, e.g., arc and gas welding. In forge welding, the surfaces to be joined or bonded together usually are heated to a temperature substantially above room temperature but below the melting temperature thereof and are pressed together, using pressures dependent upon the metals to be joined and the temperature to which such surfaces are heated, and the resulting weld is in the nature of an intercrystalline bond between the metals of the parts. In some cases, portions of the surfaces may reach melting temperature during forge welding, but the molten metal is squeezed out from between the surfaces during the application of the forging pressure so that the weld is formed between metal of one part and metal of the other part which has not been rendered molten.

Forge welding has certain advantages known to those skilled in the art, including the speed at which the weld can be performed, less distortion at the weld seam, a stronger, higher quality weld, the absence of filler metals, lower temperatures, etc.

There are many metal parts used industrially, for example, gears, flywheels, pump rotors, brake drums, etc., which are required to, or may, for economic reasons, have different properties in different portions thereof. If such parts are formed by casting, forging, machining and heat treating, they are relatively expensive, not only because of the labor involved, but also because usually the metal is the same throughout, which often means that expensive metal is required to produce properties in certain portions, whereas such expensive metal is not necessary for the properties required in the bulk of the part. It has been proposed to make such parts by welding together two or more parts having different properties or made of different metals, but the welding has been performed either by melt welding, e.g., arc or electron beam welding, forming a substantially continuous seam or by spot welding which is a form of melt or fusion welding. With arc welding, the process is relatively slow. Electron beam welding also is relatively slow and is relatively expensive. Spot welding does not provide a continuous weld seam which is disadvantageous in many cases.

It has heretofore been proposed to use electrical induction heating for the welding of metal parts, examples of such welding being given in U.S. Pat. Nos. 2,439,246 and 2,892,914. In the process described in U.S. Pat. No. 2,439,246, the heating extends throughout a relatively large volume of the metal which is inefficient and time consuming and necessarily results in substantial melting of metal if the weld is to extend across the entire faces of the abutting metal faces. Because of these disadvantages, the process is impractical for the welding of previously machined parts and is relatively slow. The process described in U.S. Pat. No. 2,892,914 avoids some of said disadvantages, but unfinished tubing is being joined at the ends and the parts being joined are of the same metal composition and the same configuration.

It has not heretofore been considered that electrical induction welding could be used to form a continuous forge weld seam between previously machined parts, particularly parts of different metals or metal alloys, not only because of the distortion, and consequently, the probable high rejection rate of remachining required, but also because the heating properties of different metals or metal alloys or of parts of different configuration, are different, causing problems which are not present when the metals are the same, or the parts have the same configuration. In connection with this latter point, it should be noted that the heating is caused by the $I^2R$ loss in the metal, and the effective resistance as well as the current distribution and penetration depends upon the composition of a metal and the frequency of the current.

However, I have discovered that by suitably configuring the induction coil and adjusting its position with respect to the desired weld line and by properly controlling the heating time, a continuous forge weld between two metal parts can be obtained without undesirable heating, and hence, without damage or harmful distortion, of portions of the parts outside of the weld area, and can be performed rapidly, e.g., within two seconds.

One object of the invention is to permit rapid forge welding with a continuous weld seam of two dissimilar metal parts, i.e., parts made of different metals or metal alloys, parts of different configuration, or parts made of different metals or metal alloys and having different configurations.

Another object of the invention is to permit such forge welding of previously machined parts without modification of the machined portions thereof during welding in a manner which will render them unsatisfactory for their intended use.

In accordance with the invention, the magnetic field of the induction coil is concentrated at the surfaces to be welded together so as to reduce the heating of portions of the parts adjacent thereto, and the heating by said field is limited in time so that the desired forge welding temperature is reached at such surfaces, without significant melting of the metal at said surfaces or overheating of such portions. The metal parts having such surfaces are continuously pressed toward each other with forge welding pressure during such heating, or forge welding pressure is applied after forge welding temperature is reached, to cause the surfaces to be forge welded together when the desired forge welding temperature is reached, such temperature being dependent upon the metals involved and the pressures which the parts are able to withstand without damage, but usually being at least 2000°F. In order to concentrate the heating current at the surfaces to be welded, the dimension of the heating coil conductor in the direction perpendicular or parallel to a plane containing at least one of such surfaces, depending upon the orientation of the surfaces with respect to the coil, is kept to a minimum consistent with the requirement that the conductor be able to carry the coil current necessary to provide the desired heating without substantial transfer of heat to the portions adjacent to but spaced from the desired weld area by thermal conduction during the application of heating current. To aid in so concentrating the current, a core or cores of magnetic material may be employed. The positioning of the conductor with respect to said plane is selected so as to bring both surfaces to the desired forge welding temperature at substantially the same time, the relative heating being dependent upon the properties of the metals involved, the frequency of the current and the configurations of the parts, so that it may be necessary, to accomplish such heating, to have more of the conductor at one side of said plane than the other. Normally, the frequency of the current will be such as to provide a reference depth in said plane at least equal to, but not substantially greater than, the dimension of the weld in said plane, reference depth being defined hereinafter.

In an alternative embodiment, the heating is concentrated at and near the surfaces to be welded by the induction coil for only a short distance in the direction of the length of the weld, and the parts are moved with respect to the coil so that the full length of the surfaces is heated to forge welding temperature substantially simultaneously.

Other objects and advantages of the invention will be apparent from the following description of preferred embodiments thereof, which description should be considered in conjunction with the accompanying drawings in which.

Figure 1:
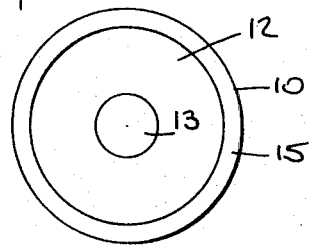
FIG. 1 is a bottom view of a center disc to be welded to a ring gear in accordance with the invention.

For a better understanding of the invention, it is desirable to call attention to certain phenomena associated with metal heating by induced electric currents. Thus, the heat developed is proportional to the square of the current times the effective resistance of the path through which the current flows. The effective path of the current induced in a part by an induction coil depends upon the skin effect, i.e., the increased density at the surface of the part, the proximity effect, i.e., the tendency of the current in the part to flow as near as possible to the conductor of the induction coil, and the reference depth, i.e., the equivalent depth assuming uniform current distribution to such depth, which is defined by the formula:

$$d \text{ in inches} = 3160 \sqrt{p/uf}$$

where p is the resistivity of the metal in ohm inches, $u$ is the relative magnetic permeability and $f$ is the frequency in cycles per second. It will be noted that reference depth decreases with frequency, which, in turn, means that the effective resistance increases with frequency. Since reference depth is also dependent upon permeability, and since magnetic materials such as steel lose their magnetic properties above a certain temperature (Curie point), it will be apparent that the reference depth for such materials progressively increases as they are heated.

The width of current path in the part is also influenced by the use of magnetic pieces at the sides of the coil conductor spaced from the portion of the part where it is desired to produce current flow and with thin materials, i.e., thinner than the reference depth, the heating power required may be reduced by the use of magnetic pieces at the side of the part opposite from where the coil conductor is located.

In addition, the current induced in the part tends to be an image of the current in the coil conductor so that the width of the current path can be modified by varying the dimension of the coil conductor in a plane parallel to the surface adjacent to the conductor.

Of course, heat is transferred to the portions of the part outside the path of current by conduction flow at a rate dependent upon the thermal conductivity of the metal, but, by rapidly heating the metal in the current path to a high temperature and then discontinuing the current flow, the temperature of such portions may be kept low as compared to that of the current carrying metal.

For all these reasons, the path of current flow and its effective dimensions, the heating and temperature obtained and the localization of the heating are dependent upon many factors including the induction coil shape and conductor size, the location of the coil conductor with respect to the part to be heated, the time duration of current flow, the electrical characteristics of the metal, the configuration of the part being heated, the magnetic material around the coil, etc. In accordance with the invention, use is made of such phenomena to concentrate the heating at the surfaces to be welded together and to bring such surfaces to forge welding temperature without raising the temperature of the metal spaced a short distance from such surfaces to a temperature which will damage the parts or otherwise render them unacceptable for their intended use, by reason of the welding thereof. It should be borne in mind that if the heat pattern is wide, the part will become distorted upon cooling, whereas with a narrow heat pattern, there is little, if any, distortion of the part.

The current paths in the workpieces will be reentrant when current is induced therein by an induction coil, and therefore, the surfaces to be joined by welding will be re-entrant. Generally speaking, the re-entrant surfaces to be joined will be defined by a pair of concentric regular figures of different sizes, e.g., a pair of concentric circles of different diameters, a pair of ellipses of different size, a pair of polygons of different size, a pair of circular, concentric bands of different corresponding diameters, etc., but it is not necessary that the side edges of such surfaces be the same as such figures. In other words, one or both of the side edges may be serrated, wavy, etc., and the width of the surfaces may vary along the length thereof. However, each of the surfaces may be identified as being between a pair of such figures. Furthermore, the surfaces need not conform to the shape of a regular figure, and instead, may be serpentine, zig-zag, etc., but each surface will be re-entrant, i.e., the ends thereof close upon each other and the inner edge of a surface does not touch itself, so as to provide a continuous, closed current path for the induced current, which path extends around a point and is spaced from such point. Usually, to provide uniform heating the induction coil will be substantially equally spaced from the surfaces to be heated at substantially all points thereon, except at the portions thereof connected to the current supplying leads, and therefore, it may be necessary, particularly with irregularly shaped surfaces, to make the coil shape the same as that of the surfaces. The width of the current path may also be varied by varying the cross-section of the coil conductor or the spacing of the conductor with respect to the parts to be heated, a greater dimension of the conductor in the path width direction or a greater space of the conductor with respect to the parts increasing the path width and vice versa.

When the planes of the surfaces to be welded together are approximately parallel to the plane of the induction coil, it is not necessary that the surfaces be in contact during the heating thereof, and the surfaces may be pressed together after they are heated to forge welding temperature. However, if they are separated during heating, the surfaces usually oxidize causing less satisfactory welds due to the occlusion of oxidized metal or making it necessary to expel the oxidized metal usually by heating the surfaces to the melting temperature of the metal and expelling the oxidized metal along with the molten metal when the surfaces are pressed together, which causes irregular beads at the edges of the weld and requires greater movement and dimensional changes of the parts during forging. Accordingly, it is preferred that the re-entrant surfaces to be welded together be in contact during the heating thereof, although spacing thereof during heating may be acceptable for certain types of welding.

Also, forge welding pressure which presses the surfaces together may be applied to the parts during the entire heating cycle, or pressure of forge welding magnitude may be applied only as the parts reach, or after they reach, forge welding temperature. In the latter case, the pressure applied to the parts prior to the application of forge welding pressure may be sufficient only to maintain the surfaces in contact and the parts in the desired relative positions.

The portions of the parts to be welded together which are nearer to the induction coil will rise in temperature faster than the portions more remote from the coil. If the teachings of the invention, e.g., coil conductor size, spacing and location, current frequency, etc., are otherwise followed but the current magnitude in the induction coil is relatively small, the surfaces to be forge welded together may never reach forge welding temperature due to thermal conduction through the parts and/or radiation. As the current magnitude is increased, a current magnitude will be reached which will cause the surfaces to reach forge welding temperature, but the time taken to reach such temperature will be such that substantial portions of the parts outside the weld area will also reach an undesirably high, and damaging, temperature due to thermal conduction in the parts. At a current magnitude somewhat higher than the last-mentioned magnitude, it will be found that by controlling the duration thereof, the surfaces to be welded together, and the immediately adjacent metal, will reach forge welding temperature before the metal farther away has substantially increased in temperature. As the magnitude of the current is further increased, it will be found that there is a range of current magnitudes and corresponding durations thereof, the duration being decreased with increasing current magnitude, which will provide the results of the invention. However, a current magnitude will eventually be reached at which, it will be found, that with a realtively short current duration, the portions of the metal nearest the coil will melt before the entire re-entrant surfaces to be welded together, and the metal immediately adjacent thereto, have reached forge welding temperature or only the portions of the surfaces and metal nearest the coil will reach forge welding temperature. The range of satisfactory current magnitude duration depends, of course, on the nature of the parts being welded together, e.g., their composition, configuration, thermal conductivity, etc., and therefore, the proper combination of current magnitude and duration for each pair of parts and apparatus arrangement will be determined empirically.

Figure 40:
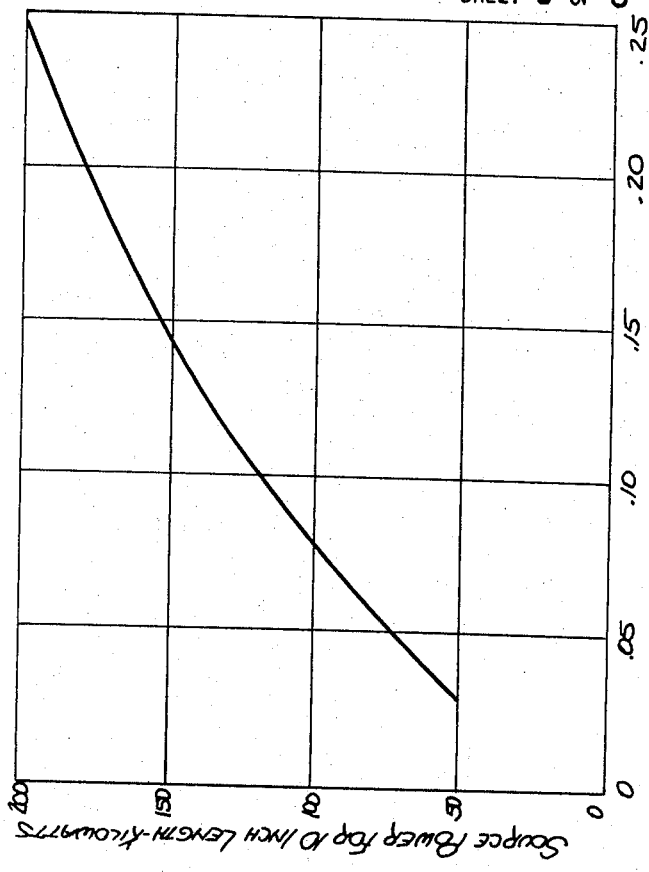
FIG. 40 is a graph illustrating typical power requirements for welding different thicknesses of low carbon steel.
Figure 39:
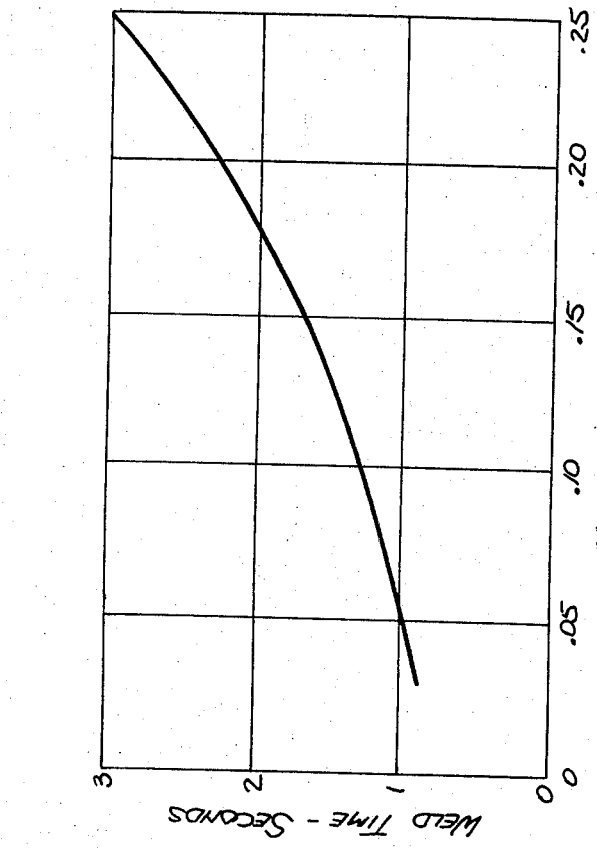
FIG. 39 is a graph illustrating typical weld times for welding different thicknesses of low carbon steel.

FIGS. 39 and 40 are graphs useful in determining the source electrical power and the welding times required for welding different thicknesses of low carbon steel, as an example. Such graphs have been prepared on the basis of the experimental results of hundreds of tests using 10Khz current and represent typical conditions. As illustrated in FIG. 39, the weld time increases with the thickness of the steel, and hence, with the re-entrant surface width if the plane of the surface is parallel to the plane of the induction coil. As illustrated in FIG. 40, the source electrical power, and hence, the related induction coil current, also increases with the thickness of the steel. Accordingly, when the thickness of the metal is known, the power to be supplied and the duration thereof can be initially and approximately determined from the graphs 39 and 40, and adjustments in power and duration thereof for the optimum or desired conditions can readily be made with tests and experience. Although FIG. 40 illustrates the power requirements for a 10 inch length of weld, the power required is proportional to the length of the weld, e.g., a 20 inch weld length would require about twice the power determined from the graph in FIG. 40 for a given thickness of metal, but the duration of power application does not change with the length.

The reference depth of current in a metal is determined from the formula set forth hereinbefore, and it is sometimes referred to as the depth in which 86% of the heat is developed. Typical reference depths, in thousandths of an inch, in various metals at 70°F are as follows:

| Material | Frequency - Kilohertz | | | | |
|---|---|---|---|---|---|
| | 0.06 | 3 | 10 | 100 | 400 |
| Steel* | 41 | 6.6 | 2 | .59 | .30 |
| Aluminum | 430 | 110 | 33 | 10 | 5 |
| Brass | 640 | 150 | 50 | 16 | 8 |
| Copper | 336 | 85 | 26 | 8 | 4 |

*Below Curie Point; for non-magnetic steel or magnetic steel above Curie Point multiply by 100 for approximate value.

It will be apparent from the foregoing table that if a relatively low frequency is employed the reference depth will usually be substantially greater than the dimension of the metal which it is desired to heat to the forge welding temperature. Therefore, if such a low frequency is used, there will be substantial heating of metal at portions other than at the surfaces to be welded together, and for this reason it is preferable to select a current frequency which provides a reference depth which is not substantially greater than the dimension of the metal which it is desired to heat. On the other hand, if the reference depth is less than one-half the dimension of the metal to be heated, the length of time required for the remainder of the metal to be welded to reach forge welding temperature by thermal conduction will be such that portions of the metal outside the weld area will also be heated to an undesirably high temperature. Accordingly, in the use of the method of the invention, it is preferred that the frequency of the current be selected so that the reference depth is at least equal to one-half the dimension to be heated to welding temperature but is not substantially greater than such dimension.

Figure 2:
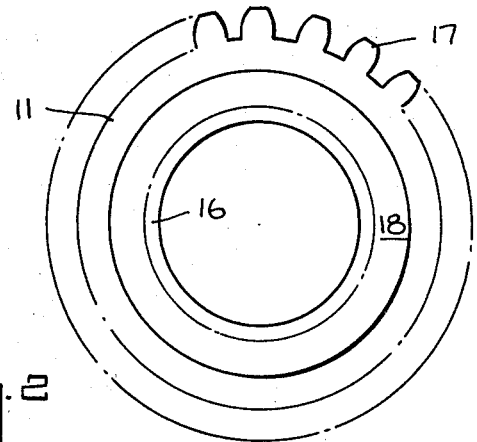
FIG. 2 is a top view of a ring gear to be welded to the center disc of FIG. 1 in accordance with the invention.

FIGS. 1–5 illustrate the application of the method of the inventioin to the forge welding of a center disc 10, illustrated in FIG. 1, to a ring gear 11, illustrated in FIG. 2. The center disc 10 illustrated in FIG. 1 may be a stamping and may, for example, be made of 1010 steel. The disc 10 has a central portion 12 with an aperture 13 therein for receiving, for example, a driving or driven shaft or a hub and has a lip portion 14 (FIG. 3) with a re-entrant surface 15 which is to be forge welded to a similarly shaped re-entrant surface portion 16 on the ring gear 11.

The ring gear 11 normally will be a machined part and formed from a hardenable steel such as a 1040 steel. The ring gear 11 has external teeth 17 and an inwardly extending flange 18 which is disposed approximately midway between the upper and lower surfaces 19 and 20 of the ring gear 11.

Figure 3:
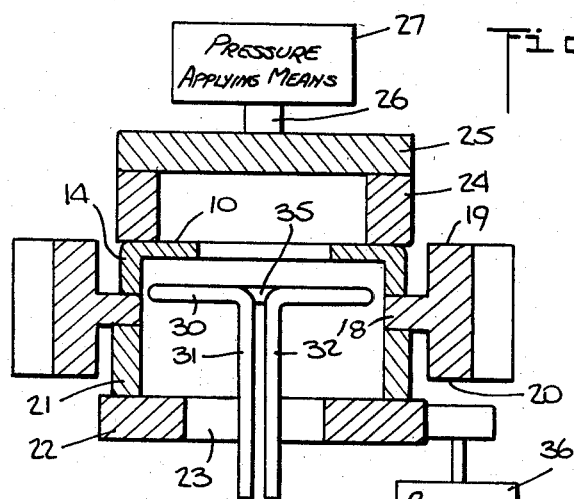
FIG. 3 is a diagrammatic, side elevation view, partly in cross-section, of the center disc of FIG. 1 engaging the ring gear of FIG. 2 and apparatus for welding them together in accordance with the invention.
Figure 4:
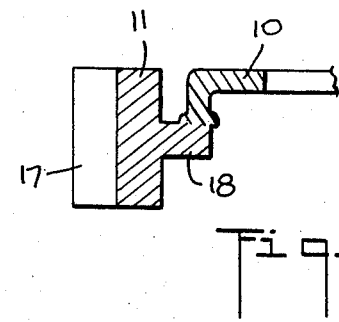
FIG. 4 is a fragmentary, side elevation view of the center disc of FIG. 1 welded to the ring gear of FIG. 2 and illustrates the appearance of the weld therebetween.

Prior to the welding thereof, the ring gear 11 is supported on its flange 18 by a ring 21 mounted on a table 22 having a central opening 23, and the disc 10 is mounted as shown in FIG. 3 with its re-entrant surface 15 in contact with the re-entrant surface portion 16 of the ring gear 11. Pressure at least sufficient to maintain the disc 10 in the position shown in FIG. 3 is applied to the disc 10 by a ring 24 which is pressed toward the disc 10 by a plate 25 mounted on a shaft 26 which is urged downwardly, as viewed in FIG. 3, by any conventional pressure applying means 27, such as an hydraulic cylinder and piston assembly. The ring 24 may, of course, be pressed against the disc 10 in any other conventional manner.

Prior to the heating of the surfaces 15 and 16, and the metal immediately adjacent thereto, to an elevated forge welding temperature, the pressure applied by the pressure applying means 27 may be only that which is sufficient to hold the disc 10 against the flange 18 with its re-entrant surface 15 in contact with the re-entrant surface 16. However, if desired, forge welding pressure, e.g., a pressure of several thousand pounds per square inch, may be applied to the disc 10 prior to the heating of the surfaces 15 and 16, and the metal immediately adjacent thereto, to the forge welding temperature. In any event, at the time that the surfaces 15 and 16 and the metal immediately adjacent thereto reach forge welding temperature, pressure sufficient to forge weld the disc 10 to the flange 18 at the surfaces 15 and 16 is applied to the disc 10. The discontinuance of the heating current may be caused by a switch actuated upon movement of the disc 10 toward the flange 18 as described in said U.S. Pat. No. 2,892,914.

The surfaces 15 and 16 and the metal immediately adjacent thereto, are heated by means of a single turn induction coil 30 formed of tubing and having input leads 31 and 32. Although the tubing may be circular in cross-section as shown, it may have a different cross-sectional shape, such as square, rectangular, elliptical, etc. Preferably, the coil 30 and the input leads 31 and 32 are cooled by conventional fluid cooling means, such as apparatus (not shown) for circulating water through the leads 31 and 32 from a high frequency source 33 through a switch 34, which, although illustrated as a manually operable switch, usually will be an automatically timed switch of a type well-known in the art.

When the switch 34 is closed, current will flow in the conductor of the coil 30 and will induce a current in the disc 10 and the flange 18 at the surfaces 15 and 16 and the metal immediately adjacent thereto. When the surfaces 15 and 16, and the metal immediately adjacent thereto, have reached an elevated forge welding temperature such as, for example, 2,000°F or higher but below the melting point of the metal, the disc 10 and the flange 18 will be pressed together by the pressure applying means 27 causing the disc 10 to be forge welded to the ring gear 11 producing a weld of the type illustrated in FIG. 4.

The rings 21 and 24 preferably are made of a low heat conductivity material, such as silicon nitride or a ceramic, in order to reduce the loss of heat from the parts during the heating thereto to welding temperature. However, other materials, such as steel, may be used for the rings 21 and 24 if their contact with the work is a reasonable distance from the weld interface, such as is shown in FIG. 3.

It will be noted from an examination of FIG. 3 that there is a gap 35 intermediate the input leads 31 and 32. For the reasons explained hereinbefore, such gap will cause the current distribution in the portion of the lip 14 and the flange 18 immediately adjacent thereto to be different from the current distribution in such lip 14 and flange 18 adjacent the remainder of the coil 30, and therefore, the heating of the lip 14 and the flange 18 adjacent such gap 35 will be less than at the other portions thereof. In many cases, such difference in heating will be unimportant, because a forge weld, produced at a somewhat lower temperature but having satisfactory characteristics, will be produced at such portion heated to a lower temperature, or because even if a weld having the same characteristics as the remainder of the weld is not produced, the remaining weld between the parts will be highly satisfactory.

However, if it is desired to make certain that all portions of the metal on the surfaces 15 and 16 are heated to substantially the same temperature prior to welding, and to thereby assure a uniform forge weld between all portions of the lip 14 and the flange 18, then the disc 10 and the ring gear 11 may be rotated at a few hundred revolutions per minute during the time that current is flowing in the coil 30. Thus, the table 22 may be rotatably mounted in any conventional manner and be rotated during the flow of current in the coil 30 by a rotating means 36 which may be of any well-known type. Of course, during the rotation of the table 22, the rings 21 and 24 and the plate 25 will also be rotated along with the disc 10 and the ring gear 11.

While it is preferred to maintain the surface 15 in contact with the surface 16 during heating thereof, for the reasons set forth hereinbefore, it is possible to have such surfaces 15 and 16 separated by a small amount, e.g., a distance less than the thickness of the conductor of the coil 30, during the heating thereof. In such case, the disc 10 would be supported by means (not shown) with its re-entrant surface 15 closely adjacent the re-entrant surface 16 during the time current is flowing in the coil 30, and after the surfaces 15 and 16 and the metal immediately adjacent thereto have reached welding temperature, the surface 15 will be pressed against the surface 16 by the pressure applying means 27.

Figure 5:
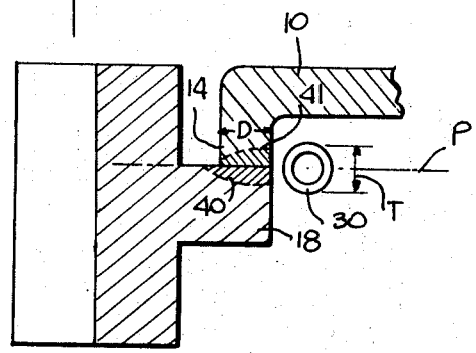
FIG. 5 is an enlarged, fragmentary, side elevation view of the center disc and ring gear illustrated in the preceding figures.

As illustrated in FIG. 5, the major heating of the lip 14 and the flange 18 will preferably be confined to within the dotted lines 40 and 41, and therefore, substantially only the metal of the lip 14 and the flange 18 between the dotted lines 40 and 41 will be heated to forge welding temperature. In order to so confine the heating, the thickness T of the conductor of the coil 30 is selected, consistent with the requirement that the conductor be able to carry the current which must flow in the coil 30 to produce the desired heating, to be relatively small and approximately equal to the dimension between the dotted lines 40 and 41 at the surfaces of the lip 14 and the flange 18 immediately adjacent the coil 30. Also, the coil 30 will be spaced from such last-mentioned surfaces by a distance which is as small as practical consistent with mechanical requirements and the ability of the air gap between the coil 30 and such surfaces to withstand the voltage between the coil 30 and such surfaces. In addition, in the preferred embodiment of the invention, the frequency of the current supplied to the coil 30 from the source 33 will be such as to provide a reference depth in the lip 14 and the flange 18 which is not substantially greater than the distance D indicated in FIG. 5. However, the frequency may be selected to provide a smaller reference depth, that is, at least equal to one-half of the distance D.

It will be noted that even if a frequency which provides a reference depth greater than the distance D is selected, the current can flow in the lip 14 only to the depth equal to the distance D. However, since the ring gear 11 has metal extending radially outwardly of its re-entrant surface 16, the selection of such a lower frequency would cause the reference depth, and hence, the current flow, to have a dimension greater than the radial dimension of the surface 16. Therefore, heating current would undesirably flow in the metal of the flange 18, and possibly the main body of the ring gear 11, at the portions thereof radially outwardly of the surface 16, and hence, radially outwardly of the portion of the metal of the flange 18 which it is desired to heat to forge welding temperature. Such heating radially outwardly of the surface 16 would not only be inefficient, but also, in many cases, would cause discoloration of the flange 18 and the main body of the ring gear 11, and distortion of either the flange 18 or the main body of the ring gear 11 or both during the cooling of the parts from forge welding temperature to room temperature.

In the embodiment illustrated in FIGS. 3 and 5, the medial plane of the coil 30, designated by the letter P in FIG. 5, is co-incident with the meeting plane of the surfaces 15 and 16. If the disc 10 and the ring gear 11 had similar electrical properties and thermal properties, including mass and thermal conductivity, the temperature of the surfaces 15 and 16 will be approximately the same as the time of forge welding. However, since the electrical and thermal properties usually are not the same, the temperature reached by the surface 16 may be different from the temperature reached by the surface 15 during the time of current flow in the coil 30. Although a satisfactory forge weld can be obtained even if the surfaces 15 and 16 are of different temperatures at the time of forge welding, it may be desirable to modify the temperatures of the surfaces 15 and 16 and the metal immediately adjacent thereto, e.g., to make the temperature of the surfaces 15 and 16 the same, or to heat a greater amount of metal in one of the parts than in the other, and for this purpose the medial plane P of the coil 30 may be displaced vertically as viewed in FIG. 5 with respect to the meeting plane of the surfaces 15 and 16. Thus, if it is desired to increase the cross-section of the current path in the lip 14 and decrease the cross-section of the current path in the flange 18, the medial plane P of the coil 30 may be raised above the meeting plane of the surfaces 15 and 16. Conversely, the cross-section of the current path in the flange 18 may be increased and the cross-section of the current path in the lip 14 may be decreased by lowering the coil 30 so that its medial plane P is below the meeting plane of the surfaces 15 and 16.

Figure 20:
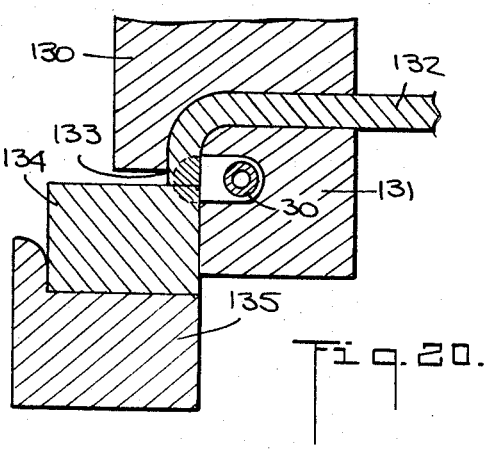

As one example of the conditions which may be employed for forge welding of the disc 10 to the ring gear 11 as illustrated in FIG. 3, but with the addition of a laminated magnetic member, hereinafter described, adjacent the coil 30 as illustrated in FIG. 20, let it be assumed that the disc 10 and the ring gear 11 have the following dimensions and characteristics:

| Ring gear 11 steel | - 1050 and teeth hardened |
| Disc 10 steel | - 1010 |
| Lip 14 | - inner radius 1.6 ins. and radial thickness D ¼ in. |
| Flange 18 | - height ¼ in. |

With such dimensions and characteristics the re-entrant contacting surfaces 15 and 16, and the metal immediately adjacent thereto, may be heated to forge welding temperature and the disc 10 and the ring gear 11 may be forge welded together in accordance with the invention using the following conditions:

| Tubing of coil 30 | - 3/16 in. outside diameter |
| Spacing of coil 30 from surfaces to be heated | - 0.1 in. |
| Vertical position of coil 30 | - medial plane P ⅛ in. below meeting plane of surfaces 15 and 16 |
| Current frequency | - 10 Khz |
| Reference depth | - 0.224 in. with metal red hot |
| Coil 30 current | - approximately 1500 amperes |
| Source power | - approximately 135 kilowatts |
| Heating time | - approximately 1.45 seconds |

Figure 6:
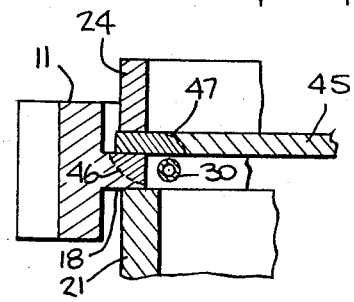
FIGS. 6 and 7 are fragmentary, cross-sectional, side elevation views of parts of various configurations which may be welded together in accordance with the invention.

The principles described hereinbefore may be employed for the welding of parts having configurations different from those illustrated in the preceding figures. Thus, as illustrated in FIG. 6, a disc or plate 45, without a lip 14, may be welded to the flange 18 of the ring gear 11. The re-entrant surfaces on the plate 45 and the flange 18, which are in contact, and the metal immediately adjacent thereto, may be heated by an induction coil 30 as shown in FIG. 6, and the major heating of the parts will be between the dotted lines 46 and 47. After said re-entrant surfaces and the metal immediately adjacent thereto have been heated to forge welding temperature, the plate 45 and the flange 18 may be pressed together with forge welding pressure by the rings 21 and 24 to form a forge weld therebetween. Preferably, the ring 24 is made of ceramic, and the ring 21 may be made of steel or ceramic.

Figure 7:
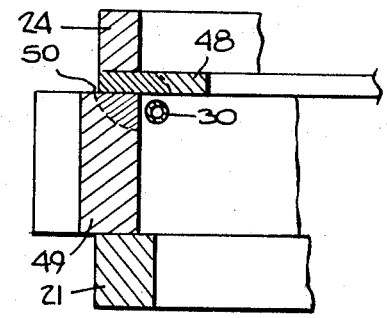

FIG. 7 illustrates the welding of a ring 48 to a ring gear 49, which does not have a flange 18, the ring 48 being welded to the upper surface 50 of the ring gear 49.

Figure 8:
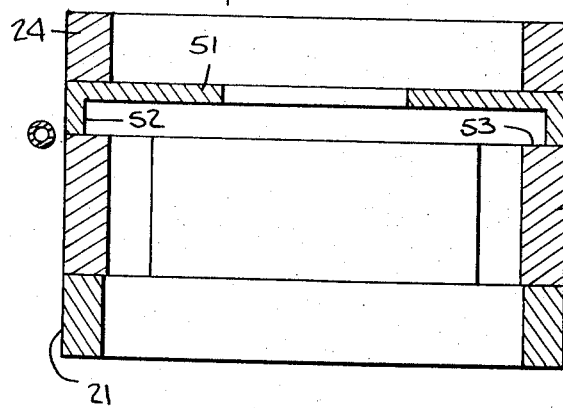
FIGS. 8 and 9 are cross-sectional, side elevation views of parts of configurations different from these shown in the preceding figures which may be welded together in accordance with the invention.

In the embodiments illustrated in the preceding figures, the induction coil 30 has been shown interiorly of at least one of the parts which is being welded to the other part. As illustrated in FIG. 8, the configuration of the parts may be such as to make it difficult to place the induction coil interiorly thereof, and therefore, the induction coil may be placed so as to encircle the re-entrant surfaces radially outwardly thereof. FIG. 8 illustrates a disc 51, similar to the disc 10 illustrated in FIGS. 1-5, having a lip 52 with a re-entrant surface in contact with a re-entrant surface portion of the upper surface 53 of an internal ring gear 54. The re-entrant surfaces are held in contact by rings 21 and 24, as described in connection with FIG. 3, and the re-entrant surfaces and the metal immediately adjacent thereto are heated to forge welding temperature by means of an induction coil 55 which is radially outwardly of the re-entrant surfaces and which is in closely spaced relation to such surfaces. As described in connection with the preceding figures, the re-entrant surfaces and the metal immediately adjacent thereto are heated to forge welding temperature by passing current through the coil 55 until the surfaces and such metal reach forge welding temperature, and either during the heating thereof or when they have reached forge welding temperature, the disc 51 and the ring gear 54 are pressed together at their re-entrant surfaces with forge welding pressure by the ring 24 to form a forge weld therebetween.

Figure 9:
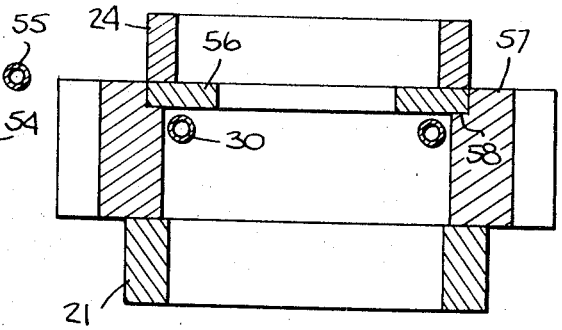

FIG. 9 illustrates the forge welding of a ring 56 to an external ring gear 57 at a ledge 58 on the ring gear 57. Thus, a re-entrant surface portion of the ring 56 is in engagement with the re-entrant surface of the ledge 58 and such surfaces and the metal immediately adjacent thereto are heated to forge welding temperature by an internal induction coil 30, similar to the coil 30 illustrated in FIG. 3. Forge welding pressure is applied to the ring 56 by the ring 24 so as to forge weld the re-entrant surfaces together when forge welding temperature is reached.

Figure 10:
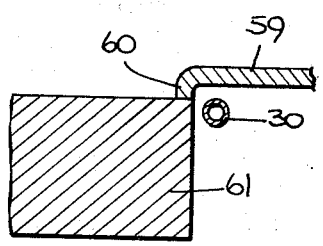
FIGS. 10–12 are fragmentary, cross-sectional, side elevation views of parts of various further those which may be welded together in accordance with the invention.

FIG. 10 illustrates a modification of the embodiment shown in FIG. 7, in which a plate or disc 59, having a lip 60, is welded to the upper surface of a ring-shaped part 61 which may, for example, be the external ring gear illustrated in FIG. 7. The pressure rings 21 and 24 have been omitted from the showing in FIG. 10 and in other subsequent figures for simplicity in illustration. However, the welding of the plate or disc 59 to the part 61 is accomplished in the manner described hereinbefore.

Figure 11:
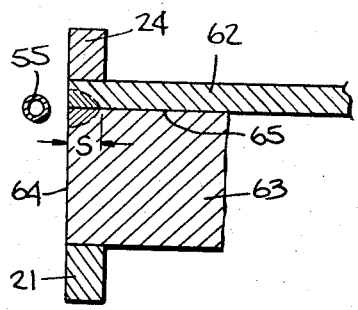

FIg. 11 illustrates the forge welding of a pair of parts having contacting surfaces greater in dimension than the desired width of the weld between the parts. Thus, in FIG. 11, a circular plate or disc 62 engages a ring or block 63 having a cylindrical outer surface 64 along a meeting line 65 having a substantial radial dimension. If an attempt were made to heat the parts along the entire contacting surfaces to forge welding temperature in accordance with the method of the invention, it would be found that a substantial portion of the metal of the parts 62 and 63 nearer the induction coil 65 would be melted prior to the time that the remainder of the contacting surfaces reached the desired forge welding temperature. However, with the method of the invention it is possible to produce a relatively narrow forge weld between the plate 62 and the ring or block 63 adjacent to the peripheries thereof. Thus, by supplying current to the induction coil 65 of sufficient magnitude for the proper time and at a frequency providing a reference depth not substantially greater than the radial width of the desired weld, all as described hereinbefore, then a forge weld can be produced between a pair of re-entrant surfaces having a radial dimension substantially equal to the dimension S indicated in FIG. 11, without raising the remainder of the metal parts 62 and 63 to a temperature which will discolor, distort or otherwise damage the parts 62 and 63.

Figure 12:
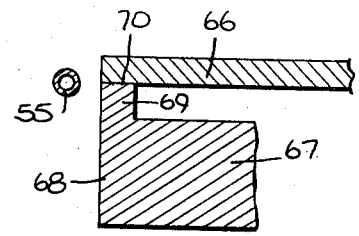

The teachings of the invention are also applicable to the forge welding of a pair of parts having the configuration illustrated in FIG. 12. As shown therein, a disc or plate 66 may be welded to an upwardly extending lip 69 of a block or ring 67, having a cylindrical outer surface 68, along the contacting re-entrant surfaces designated by the numeral 70.

Figure 13:
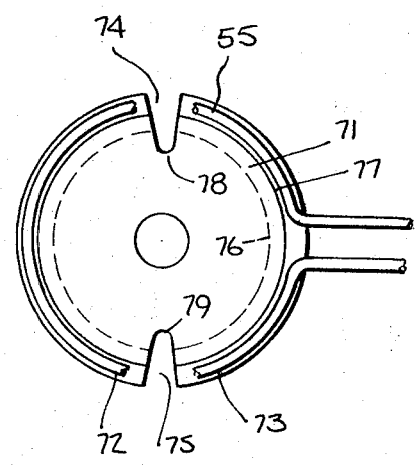
FIG. 13 is a plan view of parts having non-circular edges which may be welded together in accordance with the invention.

FIG. 13 illustrates the forge welding temperature of a substantially circular plate 71 to a pair of substantially semi-circular ring parts 72 and 73, the circular plate 71 having a pair of notches 74 and 75 therein. In the embodiment shown in FIG. 13, the plate 71 will be welded to the ring parts 72 and 73 intermediate the dotted line 76 and the outer edge 77 of the plate 71. It will be noted, however, that the path of the current in the ring parts 72 and 73 will be interrupted at the notches 74 and 75, but since the current will flow in the plate 71 around the ends 78 and 79 of the notches 74 and 75, a continuous re-entrant path will be provided for the current flowing in the parts. Normally, a satisfactory weld between the plate 71 and the ring parts 72 and 73 can be produced even though the notches 74 and 75 are present, but if desired, the notches 74 and 75 may be bridged and the ends of the ring parts 72 and 73 may be interconnected by bridging devices of a high conductivity, such as copper bars or plugs (not shown). Such bars will provide extensions of the current paths in the plate 71 and in the ring parts 72 and 73 and will not becomes welded to the plate 71 or the ring parts 72 and 73. Accordingly, the bars may be removed after the welding of the plate 71 to the ring parts 72 and 73 has been completed. Of course, it will be apparent that forge welding pressure will be applied to the plate 71 and/or the ring parts 72 and 73 only along the surfaces which it is desired to weld together.

Figure 14:
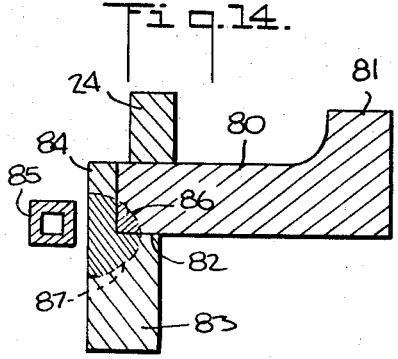
FIGS. 14 and 15 are fragmentary, side elevation views of a center disc and an outer cylinder which may be welded together in accordance with the invention.

In the embodiments described hereinbefore, the metal of both parts which it is desired to heat to forge welding temperature is directly exposed to the field of the induction coil, i.e., 30 or 55, and such metal of one part is not shielded from the induction coil by metal of the other part. As mentioned hereinbefore, it is not necessary with such embodiments that the parts be in contact along the reentrant surfaces to be welded together during the inducing of the heating current therein. However, the methods of the invention are also applicable to the welding together of parts having configurations in which the metal of one part may be shield with respect to the induction coil by metal of the other part. FIG. 14 illustrates such a configuration, and as shown therein, a central disc 80 having a hub 81 rests on a re-entrant surface ledge 82 of a ring 83. The ring 83 has a lip portion 84 extending upwardly and radially outwardly of the ledge 82 and is between an induction coil (of square cross-section, but it may also be of circular cross-section) which induces the heating current in the disc 80 and the ring 83. The coil 85 will produce a heat pattern, and hence, a major current path within the dotted lines 86 and 87, and it will be noted that the heating and the current flow is in both the ring 83 and the disc 80. However, in order for the current to flow in the disc 80, the disc 80 must be in contact with the ring 83 during the time the current is induced by the coil 85, and the reference depth of the current must be at least slightly greater than the radial dimension of the lip portion 84.

In the manner described hereinbefore, the ring 83 and the disc 80 are heated to forge welding temperature at least along a portion of the surface of the ledge 82 and the portion of the disc 80 which contacts such portion of the surface of the ledge 82. When the forge welding temperature is reached, the disc 80 is pressed against the ring 83 by a ring 24 with forge welding pressure so as to forge weld together the contacting surfaces of the ledge 82 and the disc 80. If portions of contacting surfaces of the lip portion 84 and the periphery of the disc 80 are also heated to forge welding temperature and sufficient pressure is applied to the ring 24, such so-heated portions will also be forge welded together.

In the embodiment shown in FIG. 14, the current in the disc 80 and the ring 83 is induced therein by the coil 85 disposed so as to be intersected by the plane of the meeting surfaces of the disc 80 and the ledge 82, and therefore, the principal heating takes place at and adjacent the ledge 82. However, if it is desired to forge weld the disc 80 to the ring 83 at higher portions thereof, the induction coil 55 may be disposed in the plane of the upper surface of the lip portion 84 so as to produce major heating in the metal between the dotted line 91 indicated in FIG. 15 and the outer surfaces of the disc 80 and the ring 83. Thus, when the outer peripheral surface of the disc 80 which contacts the inner surface of the lip portion 84 and the metal of the lip portion 84 are heated to forge welding temperature by the current induced therein by the coil 55, they may be forge welded together by applying forge welding pressure thereto by means of the ring 24.

Figure 15:
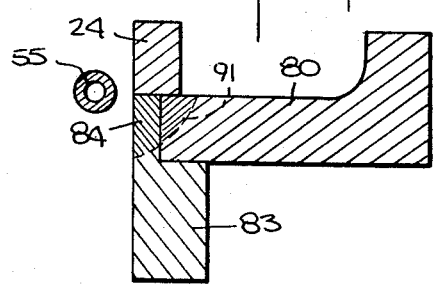
Figure 16:
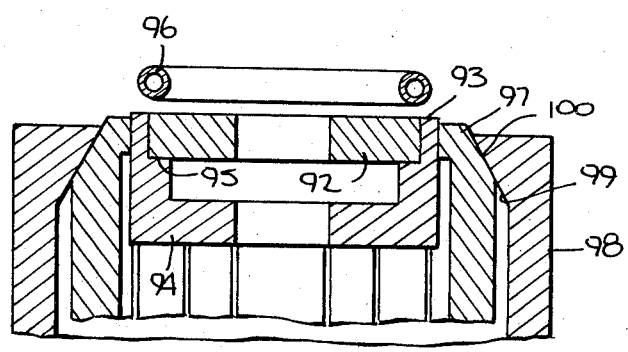
FIG. 16 is a cross-sectional, side elevation view of one form of apparatus for applying forge welding pressure to parts having the configurations shown in FIG. 16.

In the embodiment illustrated in FIGS. 14 and 15, the forge welding pressure is directed axially of the parts, but, as illustrated in FIG. 16, it is also possible to forge weld parts similar to those shown in FIGS. 14 and 15 by applying radially directed forge welding pressure thereto when the contacting re-entrant surfaces of the parts and the metal immediately adjacent thereto have reached forge welding temperature. As illustrated in FIG. 16, a circular disc 92 is received within a lip portion 93 of a cylindrical part 94, the disc 92 resting on a ledge 95 of the part 94. At least a portion of the peripheral surface of the disc 92 and of the corresponding contacting surface of the lip portion 93 may be heated to forge welding temperature by inducing current therein by means of a coil 96, and after being so heated the lip portion 93 may be pressed radially inwardly by a plurality of fingers 97 which are similar to the fingers of a lathe collet. Preferably, during the heating of the disc 92 and the part 94, the fingers 97 are out of contact with the lip portion 93 so as to reduce the conduction of heat away from the lip portion 93. When the desired forge welding temperature of the contacting surfaces has been reached, the fingers 97 are pressed inwardly against the lip portion 93 by moving a cylinder 98 downwardly, as viewed in FIG. 16, the cylinder 98 having a tapered surface 99 which mates with corresponding tapered surfaces 100 on the fingers 97.

Figure 17:
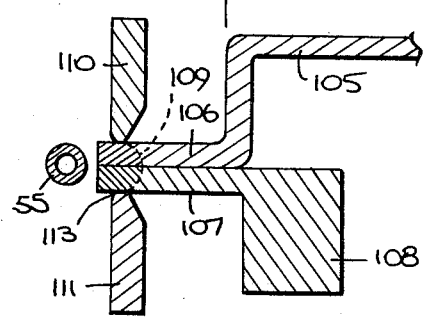
FIGS. 17–20 are fragmentary, cross-sectional, side elevation views of parts of various further configurations which may be welded together in accordance with the invention.
Figure 18:
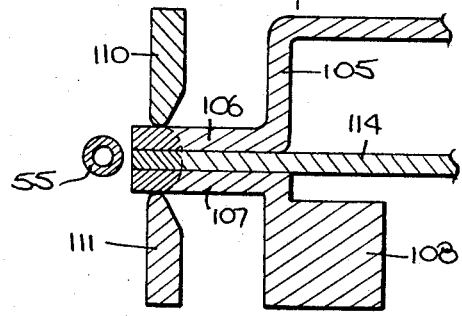

FIGS. 17 and 18 illustrate the application of the forge welding method of the invention to the welding together of the rims of a pair of parts to be joined by welding. In plan view, the rims may have any desired outline, e.g., circular, elliptical, rectangular, square, etc., and the induction coil will, as explained hereinbefore, follow the outline of the rims so as to be substantially equally spaced from the edges of the rims at all points. As indicated in FIG. 17, a cup-like part 105 has a relatively thin rim 106 which is in contact with the rim 107 of a second part 108. Although the widths of the rims may be equal to the width of the desired weld, the rims 106 and 107 shown in FIG. 17 have widths greater than the desired width of the weld which is, generally speaking, equal to the distance between the dotted line 109 indicated in FIg. 17 and the outer edges of the rims 106 and 107. The re-entrant surfaces to be welded together are in contact with each other beneath the forge welding pressure applying members 110 and 111, and such surfaces are heated to forge welding temperature as described hereinbefore in connection with FIG. 11.

The pressure applying members 110 and 111 preferably are made of a low thermal conductivity material and have the rim contacting end portions 112 and 113 thereof tapered and shaped so as to keep the contact between the members 110 and 111 and the rims 106 and 107 to a minimum consistent with the ability of the members 110 and 111 to withstand the forge welding pressures. Such ends 112 and 113 are so tapered and shaped to minimize conduction of heat away from the rims 106 and 107 during the heating thereof. The ends 112 and 113 of the members 110 and 111 will follow the contour of the rims 106 and 107 so as to contain the heated surfaces to be welded together between such ends 112 and 113.

FIG. 18 differs from FIG. 17 in that it shows simultaneous forge welding together of three separate parts. As shown in FIG. 18, the rim 106 of the cup-like part 105 is separated from the rim 107 of the part 108 by a sheet or plate 114, the lower surface of the rim 106 being in contact with the upper surface of the sheet 114 and the upper surface of the rim 107 being in contact with the lower surface of the sheet 114. During the time that heating current is induced in the rims 106 and 107 and the portion of the sheet 114 therebetween, all three parts will be simultaneously heated to forge welding temperature and may be forge welded together by squeezing them between the members 110 and 111 after forge welding temperature is reached.

Figure 19:
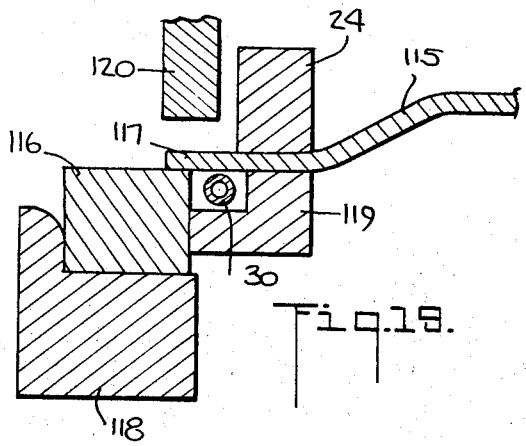

FIG. 19 illustrates the forge welding of a plate or disc 115 to the upper surface of ring 116. As mentioned hereinbefore, it is desirable to minimize the conduction of heat away from the parts to be welded together during the heating thereof, and particularly in the region of the induced current flow. Therefore, it is desired to keep the forge welding pressure applying means out of contact with the metal at the region of current flow until such time as the re-entrant surfaces and the metal immediately adjacent thereto have reached forge welding temperature. In some cases, it may be possible to maintain the re-entrant surfaces to be welded together in contact with each other without applying pressure in the region of current flow, and, in such cases, the forge welding pressure applying means may be brought into contact with the parts in the weld area until after the re-entrant surfaces and the metal immediately adjacent thereto have reached forge welding temperature.

In the embodiment illustrated in FIG. 19, the ring 116 is supported at the surfaces thereof remote from the surface portion 117 at which the weld is to be formed, by a support 118. The plate or disc 115 is supported by a further supported 119, which may be of magnetic material as described hereinafter, and is held against the support 119 by a ring 24. It will be noted that the ring 116 and the plate 115 are held in contacting relation at the weld area 117 by supports which are relatively widely spaced from the weld area 117, which aids in reducing the heat loss from the weld area 117.

After the contacting surfaces at the weld area 117 have been heated to forge welding temperature by means of the induction coil 30, the weld area surfaces may be forge welded together by pressing a ring-like hammer 120 against the upper surface of the plate 115 is the weld area 117. Thus, the forge welding pressure applying means does not contact the parts to be welded together until after forge welding temperature is reached.

As pointed out hereinbefore, the support 119 preferably is made of magnetic material and may, for example, have a construction similar to that described in U.S. Pat. No. 3,591,757 illustrated in FIG. 86 thereof. At lower frequencies the support 119 may comprise a plurality of stacked laminations of magnetic material and at higher frequencies it may be made of magnetic materials well-known in the art and having better high frequency characteristics.

Figure 21:
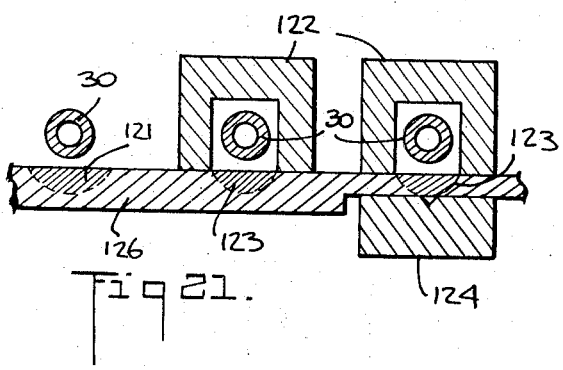
FIG. 21 is a diagrammatic, side elevation view, partly in cross-section, of coil conductors, a workpiece or part and magnetic members used to illustrate the effect of the use of magnetic materials.

The purpose of employing magnetic material for the support 119 has been described hereinbefore, and the main purpose of using magnetic material is to aid in concentrating the induced current in the portions of the parts to be welded and which are to be heated to forge welding temperature. FIG. 21 illustrates the effect of the use of magnetic materials.

As shown in FIG. 21, the cross-section of the heat pattern 121 produced in a metal part 126 adjacent to an induction coil 30 having a circular cross-section is generally semi-circular and has a width at the surface nearest the coil 30 which is dependent upon the spacing of the coil 30 from the surface of the metal. Thus, if the spacing between the coil 30 and the metal part 126 is increased the width at the surface increases and vice versa, but the depth in the metal remains constant, flattening the bottom of the semi-circle. However, if it is assumed that the spacing of the coil 30 with respect to the surface of the metal part 126 is maintained constant and the coil 30 is surrounded by a U-shaped magnetic member 122, as illustrated in FIG. 21, the magnetic member 122 being electrically insulated from the coil 30, then width of the heat pattern is reduced as indicated by the shaded area 123 within the dotted line in FIG. 21.

It has also been found that if the thickness of the metal adjacent to the coil 30 is less than the reference depth of the current in the metal part 126, then, the amount of power required to produce a predetermined amount of heating of the metal can be substantially reduced by placing a magnetic member on the side of the metal opposite from the induction coil. Thus, when the thickness of the metal is less than the reference depth at the frequency of the current and a magnetic member 124 is placed on the opposite side of the metal from the coil 30, as illustrated in the right hand portion of FIG. 21, such magnetic member 124 will substantially reduce the amount of heating power required to raise the metal to forge welding temperature.

FIG. 20 illustrates the use of a pair of magnetic members 130 and 131 in connection with the welding of a disc 132, having a lip portion 133, to a ring 134 in the manner described in connection with FIG. 10. The ring 134 is supported by a support 135, similar to the support 118 in FIG. 19, and the re-entrant surface of the lip portion 133 is pressed against a corresponding re-entrant surface of the ring 134 by the magnetic member 130. The coil 30, spaced radially inwardly of the re-entrant surface portions to be welded together, is within a cavity in the magnetic member 131 so that magnetic material is on all sides of the conductor of the coil 30, except the side facing the re-entrant surfaces. The magnetic member 131 may contact the disc 132 or may be slightly spaced therefrom, and if it contacts the disc 132, then, the magnetic member 131 will be movably mounted so as to permit downward movement thereof when the forge welding pressure is applied to the disc 132. The magnetic member 131 acts to concentrate the induced current at the re-entrant surfaces in the same manner as the magnetic member 122, described in connection with FIG. 21, and the magnetic member 130 reduces thhe amount of heating power requiring in the same manner as the member 124, described in connection with FIG. 21.

Figure 22:
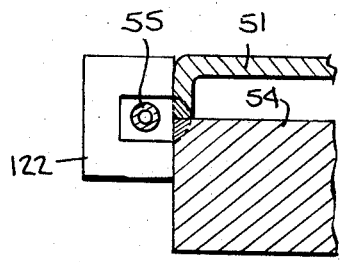
FIG. 22 is a fragmentary, side elevation view, partly in cross-section, of the parts in FIG. 8 in conjunction with a magnetic member.

FIG. 22 illustrates a modification of the embodiment shown in FIG. 8, in which the induction coil 55, which is spaced radially outwardly of the re-entrant surfaces to be welded together, is partly surrounded by a magnetic member 122 so as to concentrate the heating current at the re-entrant surfaces to be welded together. As an example of the use of the method of the invention for the forge welding of the disc 51 and the internal ring gear 54, let it be assumed that they have the following dimensions and characteristics:

| | |
|---|---|
| Ring gear 54 steel | - 1040 and teeth hardened |
| Disc 51 steel | - 1008 |
| Ring gear outer radius | - 2 in. |
| Lip of disc 51 | - radial thickness 3/16 in. | with such dimensions and characteristics the disc 51 and the gear 54 may be forge welded together at their contacting surfaces using the following conditions:

| | |
|---|---|
| Tubing of coil 55 | - 3/16 in. outside diameter |
| Spacing of coil 55 from surfaces to be heated | - 0.1 in. |
| Vertical position of coil 55 | - medial plane 1/16 in. below plane of contacting surfaces |
| Current frequency | - 10 Khz |
| Reference depth | - 0.224 in. with metal red hot |
| Coil 55 current | - approximately 1900 amperes |
| Source power | - approximately 220 kilowatts |
| Heating time | - approximately 2.25 seconds |

Figure 23:
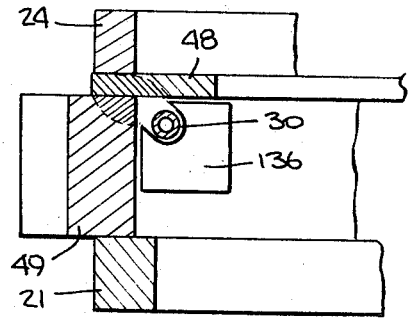
FIG. 23 is a fragmentary, side elevation view, partly in cross-section, of the parts shown in FIG. 7 in conjunction with a magnetic member.

FIG. 23 illustrates a modification of the embodiment shown in FIG. 7, in which a magnetic member 136 extends around three sides of the induction coil 30 so as to concentrate the heating current at the re-entrant surfaces to be welded together.

Figure 24:
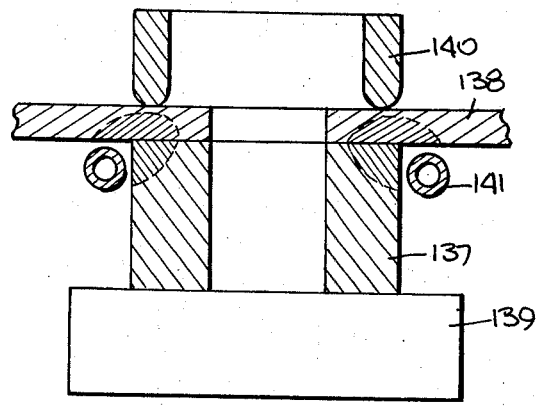
FIG. 24 is a fragmentary, side elevation view, partly in cross-section, of a plate and a hub and apparatus for welding them together.
Figure 25:
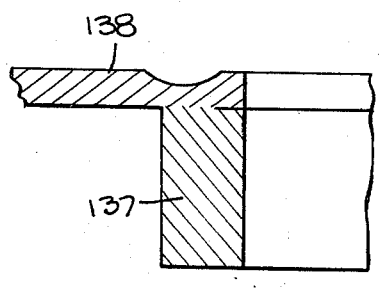
FIG. 25 is a fragmentary, cross-sectional, side elevation view of the weld obtained with the apparatus shown in FIG. 24.

FIG. 24 illustrates the use of the methods of the invention to weld a hollow, cylindrical hub 137 to a plate or disc 138. The hub 137 is supported by a table 139, which may be rotatable as described hereinbefore, and the plate 138 is pressed against the hub 137 by a low thermal conductivity ring 140. The contacting re-entrant surfaces of the hub 137 and the plate 138, and the metal immediately adjacent thereto, are heated to forge welding temperature by current induced therein by an induction coil 141 in the manner described hereinbefore. After the re-entrant surfaces and the metal immediately adjacent thereto are heated to the desired forge welding temperature, they are pressed together with forge welding pressure by the ring 140 to produce a forge weld between the hub 137 and the plate 138, FIG. 25 illustrating the appearance of the weld.

Figure 26:
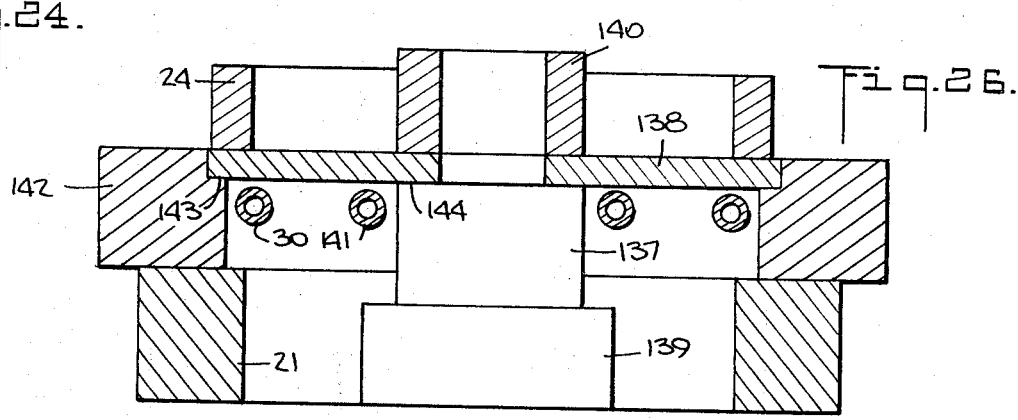
FIG. 26 is a side elevational view, partly in cross-section, of apparatus for simultaneously producing a pair of welds between parts of the configurations shown in FIGS. 9 and 24.

As illustrated in FIG. 26, the methods described in connection with FIGS. 9 and 24 may be combined to produce welds simultaneously, or in immediate succession, between the plate 138 and both the hub 137 and an external ring 142. Thus, as illustrated in FIG. 26, the contacting re-entrant surfaces 143 and 144, and the metal immediately adjacent thereto, may be heated simultaneously by the coils 30 and 141, and then forge welded together by applying pressure to the rings 24 and 140. Alternatively, the contacting surfaces 143 and 144, and the metal immediately adjacent thereto, may be successively heated by the coils 30 and 141 and then successively forge welded together by the rings 24 and 140, the interval between heating and pressing thereof preferably being relatively short.

Figure 27:
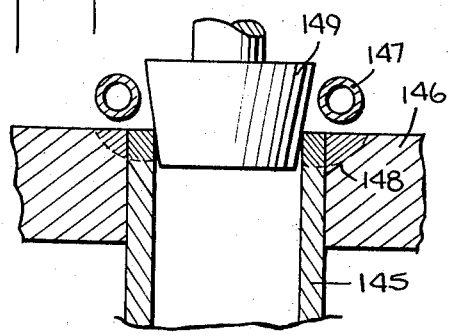
FIGS. 27–29 are fragmentary, side elevation views, partly in cross-section, of apparatus for applying forge welding pressure to parts heated to welding temperature.

FIG. 27 illustrates the welding of a tube 145 to a relatively thick part, such as a plate or disc 146, with the end of the tube substantially flush with the upper surface of the plate 146. The end portion of the tube 145 and the contacting surface portion of the plate 146 are heated by an induction coil 147 in the manner described hereinbefore. The major heating will be produced within the portions of the tube 145 and the plate 146 within the dotted line 148 and the weld will usually be confined to such portions. During such heating of the tube 145 and the plate 146, a ceramic tapered plug 149 may be in the position shown in FIG. 27, and after the contacting surfce portions of the tube 145 and the plate 146 within the dotted line 148 have reached forge welding temperature, they may be pressed together by forcing the plug 149 downwardly, as viewed in FIG. 27. However, if desired, the plug 149 may be maintained out of contact with the tube 145 during the heating of the parts, and may thereafter be forced downwardly into the tube 145 to press the heated portion of the tube 145 outwardly against the heated surface of the plate 146. In this latter case, the plug 149 may be made of a metal, such as steel.

Figure 28:
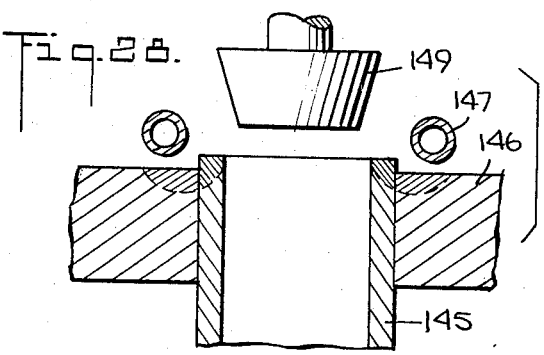

FIG. 28 illustrates a modification of the embodiment shown in FIG. 27, in which the end of the tube 145 extends above the upper surface of the plate 146, and the tapered plug 149 is maintained out of contact with the tube 145 during the heating of the contacting re-entrant surface portions of the tube 145 and the plate 146. The heating of such re-entrant surface portions will be as described hereinbefore, and after they have been heated to forge welding temperature, the plug 149 is moved downwardly into contact with the interior end portion of the tube 145 to forge weld it to the plate 146.

Figure 29:
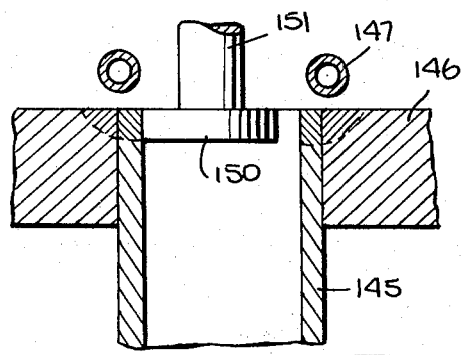
Figure 30:
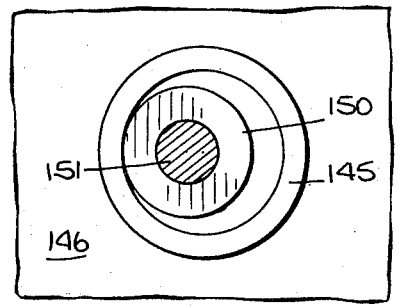
FIG. 30 is a fragmentary, plan view of the apparatus shown in FIG. 29.

FIGS. 29 and 30 illustrates modified apparatus for forge welding the tube 145 to the plate 146 after the re-entrant contacting surface portions have been heated to forge welding temperature as described hereinbefore. In the embodiment illustrated in FIGS. 29 and 30, the heated end portion of the tube 145 is pressed against the plate 146 by means of a wheel or roller 150 mounted on a driven shaft 151. Thus, after the portions of the tube 145 and the plate 146 have been heated to forge welding temperature as described hereinbefore, they are held against movement while the wheel 150 is pressed against the inner surface of the tube 145 and the shaft 151 is driven in an obvious manner so that the wheel 150 travels around the inner surface of the tube 145 and presses the heated portion thereof against the heated portion of the plate 146.

Figure 31:
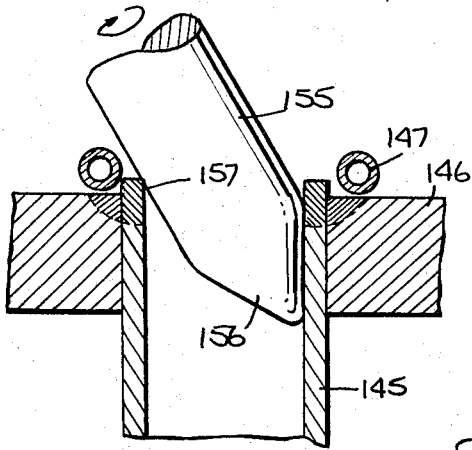
FIG. 31 is a fragmentary, side elevation view, partly in cross-section, of further apparatus for applying forge welding pressure to parts heated to welding temperature.

Another form of apparatus for forging the heated parts is illustrated in FIG. 31. As illustrated therein, the heated end portion of the tube 145 and the heated portion of the plate 146 are forged together by a rotatable rod 155 having a tapered end 156 which engages the inner surface of the tube 145. The rod 155 is rotated by any conventional means and the upper end of the axis of rotation thereof follows a circular path as the rod 155 is rotated so that the portion 157 of the rod 155 sequentially bears against the entire inner periphery of the heated portion of the tube 145 and presses it against the heated portion of the plate 146.

Figure 33:
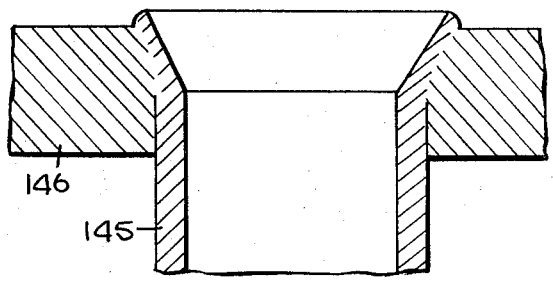
FIG. 33 is a fragmentary, cross-sectional, side elevation view of the weld between the parts shown in FIG. 32.
Figure 32:
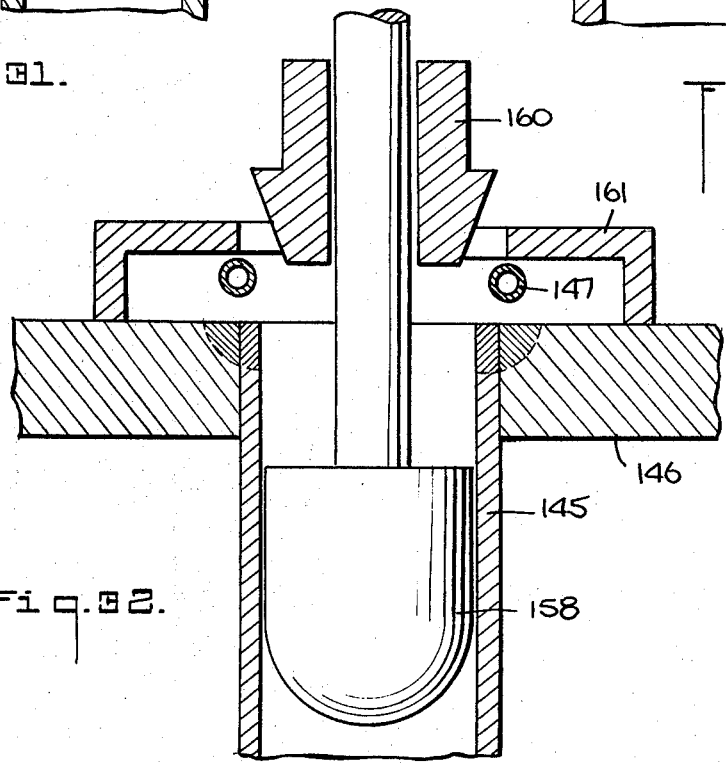
FIG. 32 is a fragmentary, side elevation view, partly in cross-section, of further apparatus for applying forge welding pressure to parts heated to welding temperature.
Figure 34:
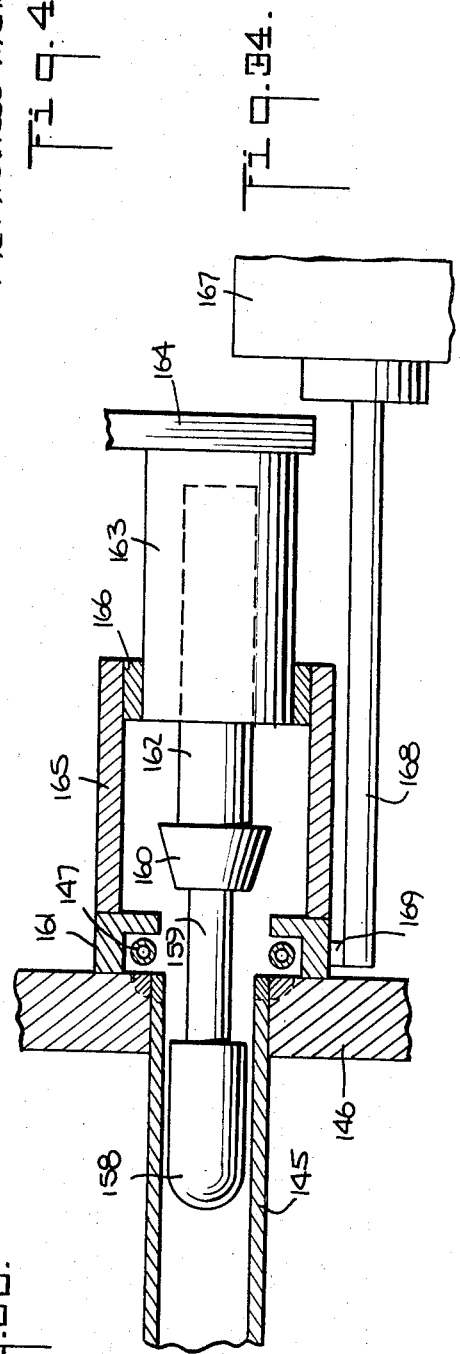
FIG. 34 is a side elevation view, partly in cross-section, of a modified form of the apparatus illustrated in FIG. 32.

Another form of apparatus for forge welding the heated parts together is illustrated in FIGS. 32 and 34, and the shape of the parts after they have been welded together is illustrated in FIG. 33. In the apparatus illustrated in FIGS. 32 and 34, a centering plug 158, which may be of metal or ceramic, has a sliding fit within the tube 145 and is supported by a shaft 159. A forging plug 160 is mounted on the shaft 149 and may either be secured to such shaft 159 so as to move therewith, or be loosely mounted thereon so as to be downwardly movable with respect to the shaft 159. Thus, after the end portion of the tube 145 and the adjacent portion of the plate 146 have been heated to forge welding temperature, the forging plug 160 is moved downwardly pressing the heated portion of the tube 145 against the heated portion of the plate 146 and producing a weld having the shape illustrated in FIG. 33. Of course, the tube 145 and the plate 146 are supported to prevent downward movement thereof. It will be noted from FIG. 33 that the end of the tube 145 is flared, which is particularly desirable for the tubes of heat exchangers, such as boilers, because of the flaring of the end of the tube 145.

FIG. 32 illustrates a magnetic member 161 of the type hereinbefore described, which magnetic member may be used to aid in concentrating the heating current on the portions of the tube 145 and the plate 146 which it is desired to heat to forge welding temperature. However, if desired, the magnetic member 161 may be omitted.

FIG. 34 illustrates diagrammatically the apparatus shown in FIG. 32 in conjunction with means for pressing the forging plug 160 against the end of the tube 145 and means for supplying heating current to the coil 147. In FIG. 34, the forging plug 160 is mounted on the piston shaft 162 of an air cylinder 163, which is supported from a fixed plate 164. The cylinder 163 is also partially supported by a cylinder 165 engaging the magnetic member 161 and at the opposite end being secured to the cylinder 163 through an annular ring 166. Thus, after the end portion of the tube 145 and the adjacent portion of the plate 146 have been heated to forge welding temperature, air is admitted into the cylinder 163 causing the forging plug 160 to engage the end of the tube 145 as described hereinbefore and to produce a forge weld of the type illustrated in FIG. 33.

FIG. 34 also illustrates diagrammatically a transformer 167 which is connected to the source of electrical heating power in a conventional manner (not shown) and which is connected to the coil 147 through a pair of leads 168, the magnetic member 161 having an opening therethrough permitting the passage of the coil leads 169 therethrough.

Figure 35:
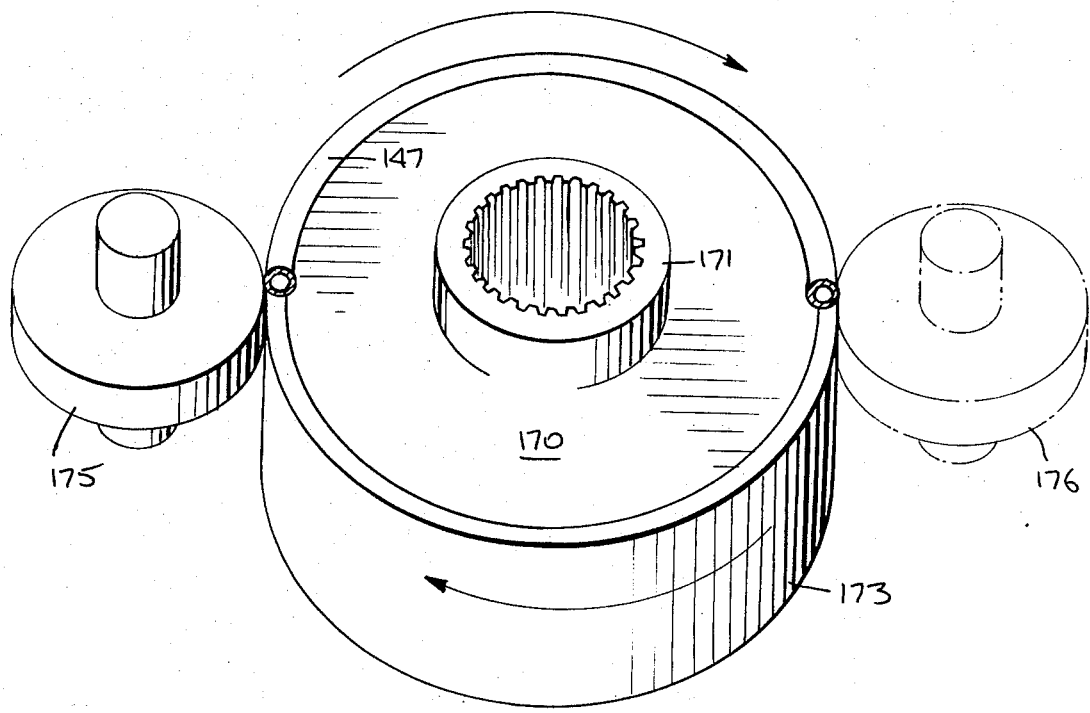
FIG. 35 is a perspective view of a modified embodiment of the apparatus of the invention.
Figure 36:
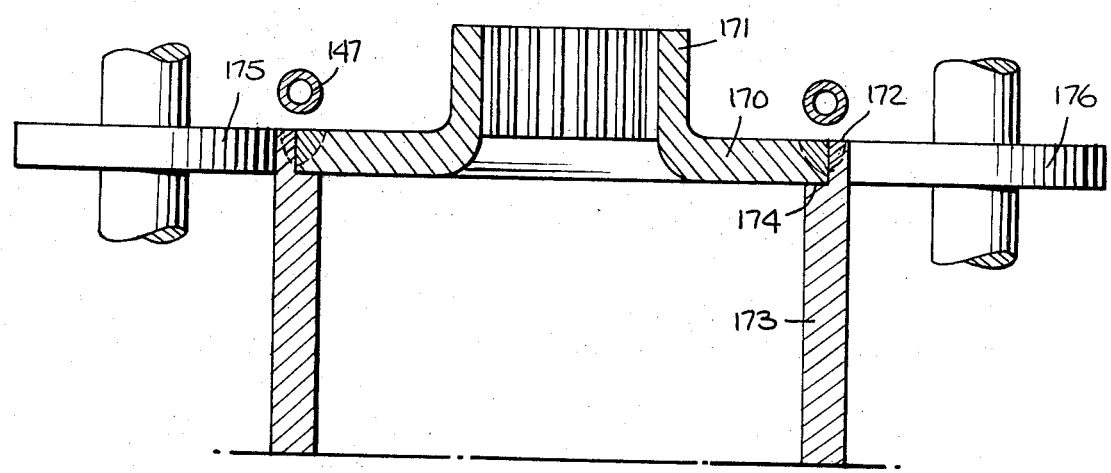
FIG. 36 is a side elevation view, partly in cross-section, of the apparatus shown in FIG. 35.

FIGS. 35 and 36 illustrate the use of the method of the invention for welding together parts which may, for example, form a combustion engine fly-wheel. As illustrated in FIGS. 35 and 36, a disc 170, having a splined hub 171, is received within a rim 172 of a hollow, cylinder 173. The disc 170 rests on a ledge 174 of the cylinder 173 and the cylinder 173 is rotatably supported by any suitable means, such as the means illustrated in FIG. 38, so that it can be rotated about the axis thereof. After the rim 172 and the adjacent portion of the disc 170 have been heated to forge welding temperature by means of the coil 147, the rim 172 is pressed against the edge of the disc 170 with a force sufficient to forge weld the rim 172 and the disc 170 together by means of a plurality of driven rollers 175 and 176 which bear against the outer periphery of the rim 172. The rollers 175 and 176 may be driven in any conventional manner, and although only one such roller may be employed, it is preferably to employ a plurality of rollers disposed on opposite sides of the axis of the cylinder 173 so that the force of one roller will be counterbalanced by the force of another roller. Although only two rollers 175 and 176 have been shown in FIGS. 35 and 36, it will be apparent that additional rollers disposed around the periphery of the rim 172 may be employed.

In all of the embodiments shown in the preceding figures, the induction coil has been substantially circular and shaped to be adjacent substantially the entire length of the re-entrant surfaces to be heated to forge welding temperature. It is also possible to apply the method of the invention to the forge welding together of metal parts using a coil which is not circular provided that arrangements are made to forge weld together the portions which have been heated to forge welding temperature at the time that they reach such temperature.

Figure 37:
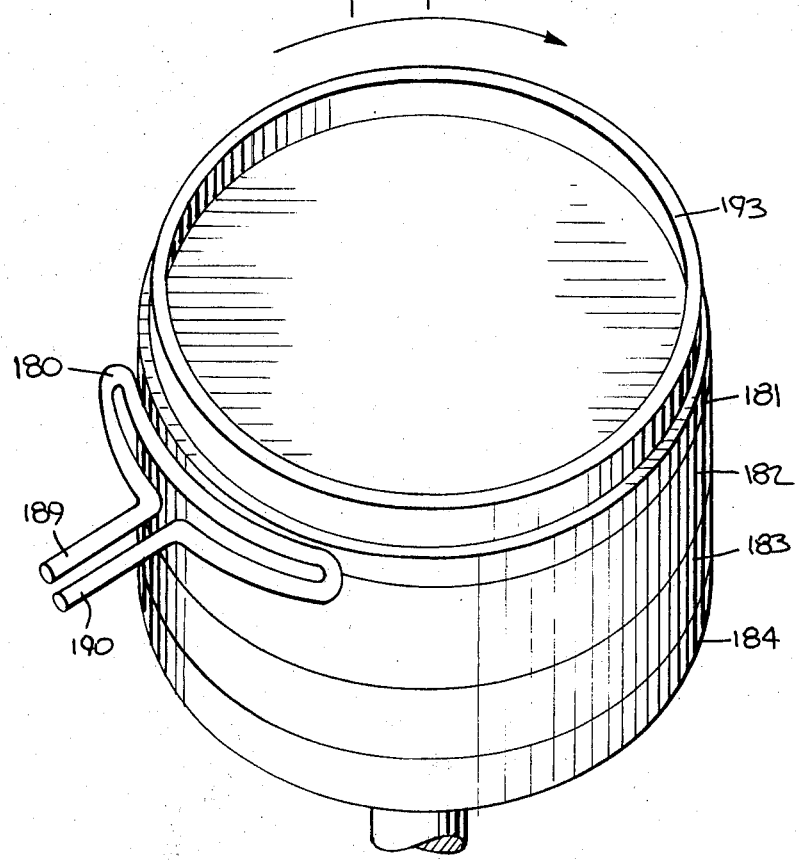
FIG. 37 is a perspective view of a modified embodiment of the apparatus of the invention.
Figure 38:
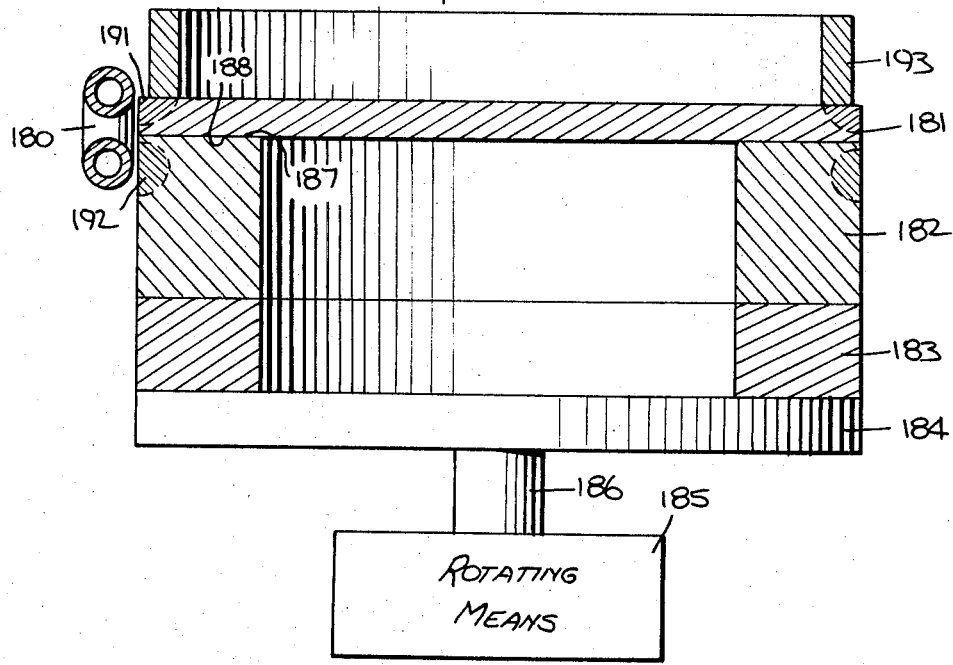
FIG. 38 is an enlarged, side elevation view, partly in cross-section, of the embodiment shown in FIG. 37.

FIGS. 37 and 38 illustrate an embodiment for forge welding together a pair of metal parts their re-entrant contacting surfaces using a semi-circular loop 180 to induce the heating current in the parts to be welded together. In the embodiment in FIGS. 37 and 38, a circular plate 181 rests on the upper surface of an annular ring 182 which is supported by a ring 183, of metal or ceramic, mounted on a rotatable table 184. The table 184 is rotatable at a speed on the order of a few hundred revolutions per minute by rotating means 185 having a rotatable shaft 186 which supports the table 184.

Although the plate 181 and the ring 182 may be joined together in accordance with the invention along the entire contacting surfaces 187 and 188, i.e., across the entire radial width thereof, normally they will be joined together by welding along only a portion of the radial width thereof. The portion which it is desired to heat and the metal adjacent thereto is heated by supplying current of the desired magnitude and frequency to the loop 180 through the leads 189 and 190 thereof, which causes initial heating at the shaded areas 191 and 192. While current is supplied to the loop 180 the table 184 is rotated thereby causing the parts supported by the table 184 to be rotated as well. Accordingly, by suitably interrelating the current flowing in the loop 180 and the speed of rotation of the table 184, it is possible to bring the contacting surfaces of the plate 181 and the ring 182 to substantially the same forge welding temperature througout the circumferential length of such surfaces.

Although the plate 181 and the ring 182 will initially be heated mainly at the portions thereof closest to the loop 180, it will be observed that the contacting surfaces 187 and 188 are intermediate the upper and lower parts of the loop 180 so that, as the heating continues, the maximum temperature will be reached at the contacting surfaces 187 and 188 adjacent to the loop 180. When the contacting surfaces 187 and 188 at the portions thereof it is desired to weld together have reached the desired forge welding temperature, the plate 181 may be pressed toward the ring 182 by applying downward pressure to the plate 181 by means of a ring 193 which, preferably, is made of a ceramic material.

Although only preferred embodiments of the invention have been described, it will be understood by those skilled in the art that various modifications may be made without departing from the principles of the invention.

What is claimed is:

1. A method of forge welding together a first metal part at a surface thereof to a second metal part along a correspondingly shaped surface thereof at an elevated, forge welding temperature, each said surface extending around and being spaced from a predetermined point to form a closed, electrically conductive path having a pair of edges, one at one side of the path and the other at the other side of said path, the spacing between said edges on one said surface being substantially equal to the spacing between said edges on the other said surface and said surface of said first metal part being spaced from said point by substantially the same distance as said surface of said second metal part, at least one of said parts having metal extending from at least one edge of its said path in a direction away from said path, said direction being parallel to said surface of said last-mentioned one part, said method comprising placing said surface of one said part adjacent and facing said surface of the other said part to thereby provide a pair of facing surfaces; heating the metal at said facing surfaces to said forge welding temperature by inducing an alternating current in the metal at said facing surfaces with an induction coil closely adjacent said facing surfaces, said coil having a conductor extending at least partly around said point and having a shape in the circumferential direction around said point corresponding substantially to the shape in said circumferential direction of at least one said surface, the dimension of said conductor in said circumferential direction being the length thereof, the path of said current at the surface of said metal which is nearest said conductor having a predetermined width in a first direction substantially at right angles to said length dimension of said conductor and said conductor having a dimension in said first direction approximately equal to the desired dimension of said width of said path of the current flow in the metal to be heated to confine said current to a relatively narrow path in said last-mentioned metal, said current having a reference depth in said metal at said forge welding temperature at least equal to one-half the dimension, in a second direction substantially perpendicular to said first direction, of the metal intermediate said conductor and said edges of said facing surfaces which are farthest from said conductor; terminating said current when the metal at said facing surfaces reaches said forge welding temperature and while substantially all of said metal extending away from said edge of said surface of said first-mentioned one part is still at a lower temperature, said current being of a magnitude sufficient to so heat the metal at said facing surfaces to said forge welding temperature before a significant portion of said metal extending away from said last-mentioned edge reaches said forge welding temperature and being of a magnitude less than that which will cause the metal nearest said conductor to melt significantly during the time of flow of said current; and pressing said parts together at said surfaces with forge welding pressure at least when said metal at said facing surfaces has reached said forge welding temperature.

2. A method as set forth in claim 1, wherein said reference depth is at least equal to said dimension of said metal in said second direction.

3. A method as set forth in claim 2, wherein said reference depth is not substantially greater than said dimension of said metal in said second direction.

4. A method as set forth in claim 1, wherein said pair of surfaces are each between a pair of concentric circles of different diameters, said first-mentioned one part has metal radially outwardly of the larger diameter circle, said current is induced in said surfaces and the metal adjacent thereto by a generally circular induction coil of a diameter smaller than the smaller diameter circle and disposed inwardly of the latter and said reference depth if at least equal to the radial dimension of the metal between said coil and said coil of larger diameter.

5. A method as set forth in claim 1, wherein said pair of surfaces are each between a pair of concentric circles of different diameters, said first-mentioned one part has metal radially inwardly of the larger diameter circle, said current is induced in said pair of surfaces and the metal adjacent thereto by a generally circular induction coil of a diameter larger than the larger diameter circle and disposed outwardly of the latter and sad reference depth is at least equal to the radial dimension of the metal between said coil and said circle of smaller diameter.

6. A method as set forth in claim 1, wherein said pair of surfaces are circular, concentric bands of different corresponding diameters, one inside the other, said first-mentioned one part has metal axially of its pair surface, said current is induced in said surfaces and the metal adjacent thereto by a generally circular induction coil of a diameter smaller than the band of smaller diameter and disposed inwardly of the latter and said reference depth is at least equal to the radial dimension of the metal between said coil and the larger diameter band.

7. A method as set forth in claim 1, wherein said pair of surfaces are circular, concentric bands of different corresponding diameters, one inside the other, said first-mentioned one part has metal axially of its said surface, said current is induced in said surfaces and the metal adjacent thereto by a generally circular induction coil of a diameter larger than the band of larger diameter and disposed outwardly of the latter and said reference depth is at least equal to the radial dimension of the metal between said coil and the smaller diameter band.

8. A method as set forth in claim 1, wherein said surface of one said part is placed in contact with said surface of the other said part prior to heating thereof and said parts are pressed together at said pair of surfaces during said heating.

9. A method as set forth in claim 8, wherein said parts are pressed together at said pair of surfaces during said heating with forge welding pressure.

10. A method of forge welding together a pair of dissimilar metal parts, one part having a surface with generally circular inner and outer edges and the other part having a surface corresponding in shape and size to said surface of said one part and having metal extending in a radial direction with respect to its surface and from an edge thereof, said method comprising placing said surface of said one part in contact with said surface of said other part to thereby provide a pair of contacting and facing surfaces; heating said surfaces and the metal immediately adjacent and extending perpendicular thereto to an elevated, forge welding temperature by including an alternating current in the metal of said parts at and adjacent said surfaces with a generally circular induction coil closely adjacent said surfaces, concentric therewith and spaced radially therefrom, said coil having a dimension in a direction perpendicular to the plane of meeting of said surfaces approximately equal to the desired dimension in said last-mentioned direction of the current flow in the metal to be heated to confine said current to a relatively narrow path in said last-mentioned metal and said current having a reference depth in said metal at said forge welding temperature at least substantially equal to the dimension of said surfaces in the direction parallel to said plane; terminating said current when said surfaces and the metal immediately adjacent thereto reach said forge welding temperature and while substantially all of said metal extending radially of said surface of said other part is still at a lower temperature, said current being of a magnitude sufficient to so heat said surfaces and said metal immediately adjacent thereto to said forge welding temperature before a significant portion of said metal extending radially reaches said forge welding temperature and being of a magnitude less than that which will cause the metal nearest said coil to melt significantly during the time of flow of said current; and pressing said parts together at said surfaces with forge welding pressure at least when said surfaces and said metal immediately adjacent thereto have reached said forge welding temperature.

11. A method as set forth in claim 10, further comprising increasing the current density in the metal at and adjacent said surfaces by providing magnetic means around the conductor of said coil other than at the portion thereof facing said surfaces and extending for the circumferential length thereof.

12. A method as set forth in claim 11, wherein said magnetic means is placed in contact with the metal of said parts at portions thereof spaced from said surfaces.

13. A method of forge welding together a pair of dissimilar metal parts, one part having a surface in the shape of a generally circular band and the other part having a surface corresponding in shape to said surface of said one part but of a different diameter and having metal extending in an axial direction with respect to its surface and from an edge thereof, said method comprising placing said surface of said one part in contact with said surface of said other part to thereby provide a pair of contacting and facing surfaces; heating said surfaces and the metal immediately adjacent thereto to an elevated, forge welding temperature by inducing an alternating current in the metal of said parts at and radially adjacent said surfaces with a generally circular induction coil closely adjacent said surfaces, concentric therewith and spaced radially therefrom, said coil having a dimension in a direction parallel to said surfaces approximately equal to the dimension in said last-mentioned direction of said surfaces to confine said current to a relatively narrow path in said last-mentioned metal and said current having a reference depth in said metal at said forge welding temperature at least substantially equal to the thickness of the metal between said coil and said surfaces in the direction perpendicular to said surfaces; terminating said current when said surfaces and the metal immediately adjacent thereto reach said forge welding temperature and while substantially all of said metal extending axially of said surface of said other part is still at a lower temperature, said current being of a magnitude sufficient to so heat said surfaces and said metal immediately radially adjacent thereto to said forge welding temperatures before a significant portion of said metal extending axially of said surfaces reaches said forge welding temperature and being of a magnitude less than that which will cause the metal nearest said coil to melt significantly during the time of flow of said current; and pressing said parts together at said surfaces with forge welding pressure at least when said surfaces and said metal immediately adjacent thereto have reached said forge welding temperature.

14. A method of forge welding together a pair of dissimilar metal parts, one part having a surface in the shape of a generally circular band and the other part having surface corresponding in shape and size to said surface of said one part but of a different diameter and having metal extending in an axial direction with respect to its said surface and from an edge thereof, said method comprising placing said surface of said one part in contact with said surface of said other part to thereby provide a pair of contacting and facing surfaces; heating said surfaces and the metal immediately adjacent thereto to an elevated, forge welding temperature by inducing an alternating current in the metal of said parts at and adjacent said surfaces with a generally circular induction coil closely adjacent said surfaces, concentric therewith and spaced axially therefrom, said coil having a dimension in a direction perpendicular to said surfaces approximately equal to the dimension in said last-mentioned direction of the metal adjacent said surfaces to be heated to confine said current to a relatively narrow path in said last-mentioned metal and said current having a reference depth in said metal at said forge welding temperature at least substantially equal to the dimension of said surfaces in the direction parallel to said surfaces; terminating said current when said surfaces and the metal immediately adjacent thereto reach said forge welding temperature and while substantially all of said metal extending axially of said surface of said other part is still at a lower temperature, said current being of a magnitude sufficient to so heat said surfaces and said metal immediately adjacent thereto to said forge welding temperature before a significant portion of said metal extending axially of said surfaces reaches said forge welding temperature and being of a magnitude less than that which will cause the metal nearest said coil to melt significantly during the time of flow of said current; and pressing said parts together at said surfaces with forge welding pressure at least when said surfaces and said metal immediately adjacent thereto have reached said forge welding temperature.

* * * * *

UNITED STATES PATENT OFFICE
CERTIFICATE OF CORRECTION

PATENT NO. : 3,872,275
DATED : March 18, 1975
INVENTOR(S) : Wallace C. Rudd

It is certified that error appears in the above-identified patent and that said Letters Patent are hereby corrected as shown below:

| | |
|---|---|
| Col. 1, line 53 | "disadvantaeous" should be --disadvantageous-- |
| Col. 2, line 8 | "of" should be --or-- |
| Col. 3, line 49 | "those" should be --configurations-- |
| Col. 4, line 27 | after "applying" delete semicolon |
| Col. 7, line 13 | "realtively" should be --relatively-- |
| Col. 9, line 57 | "after "will" insert --still-- |
| Col. 11, line 6 | "as" should be --at-- |
| Col. 13, line 56 | "becomes" should be --become-- |
| Col. 14, line 7 | "shield" should be --shielded-- |
| Col. 16, line 6 | "desired" should be --desirable-- |
| line 23 | "supported" should be --support-- |
| line 36 | "is" should be --in-- |
| line 43 | "after "3,591,757" insert --and-- |
| Col. 17, line 3 | "after "then" insert --the-- |
| line 42 | "thhe" should be --the-- |
| line 43 | "quiring" should be --quired-- |

UNITED STATES PATENT OFFICE
CERTIFICATE OF CORRECTION

PATENT NO. : 3,872,275  
DATED : March 18, 1975  
INVENTOR(S) : Wallace C. Rudd

PAGE 2

It is certified that error appears in the above-identified patent and that said Letters Patent are hereby corrected as shown below:

| | | |
|---|---|---|
| Col. 18, line 17 | "methods" should be --method-- | |
| line 60 | "surfce" should be --surface-- | |
| Col. 19, line 50 | "shaft 149" should be --shaft 159-- | |
| Col. 20, line 66 | after "parts" insert --at-- | |
| Col. 21, line 54 (Claim 1) | "of the path" should be --of said path-- | |
| Col. 22, line 54 (Claim 4) | "if" should be --is-- | |
| line 55 (Claim 4) | "coil (2nd occurrence) should be --circle-- | |
| line 64 (Claim 5) | "sad" should be --said-- | |
| Col. 23, line 4 (Claim 6) | "pair" should be --said-- | |
| line 43 (Claim 10) | "including" should be --inducing-- | |
| Col. 24, line 45 (Claim 13) | "temperatures" should be --temperature-- | |
| line 59 (Claim 14) | after "having" insert --a-- | |

Signed and sealed this 17th day of June 1975.

(SEAL)  
Attest:

RUTH C. MASON  
Attesting Officer

C. MARSHALL DANN  
Commissioner of Patents  
and Trademarks